Feb. 12, 1935.  E. M. PINNEY  1,991,029
PORTABLE AUTOMOBILE DESK
Filed Dec. 18, 1933
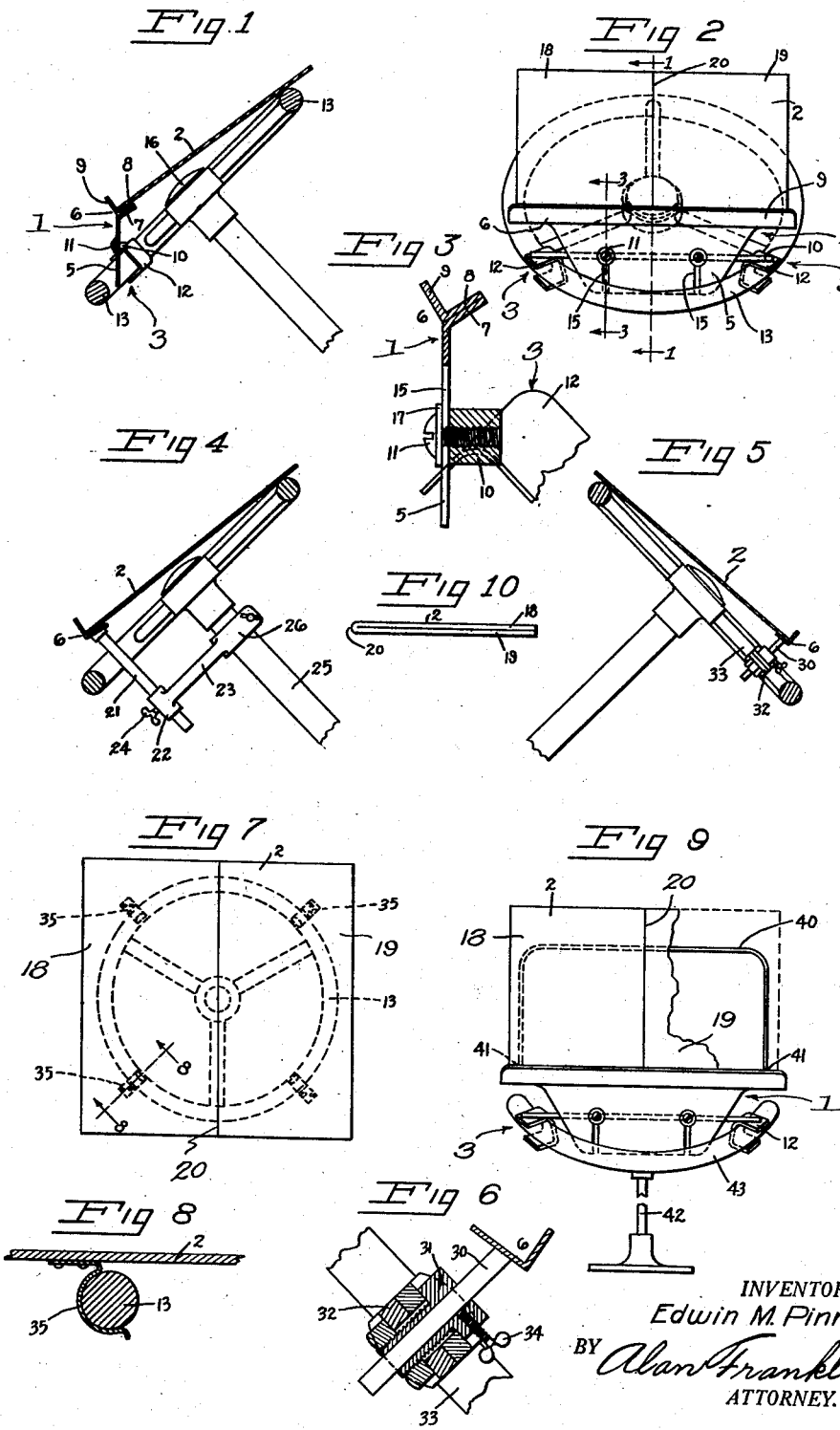
INVENTOR:
Edwin M. Pinney
BY Alan Franklin
ATTORNEY.

Patented Feb. 12, 1935

1,991,029

UNITED STATES PATENT OFFICE 1,991,029

PORTABLE AUTOMOBILE DESK

Edwin M. Pinney, Los Angeles, Calif.

Application December 18, 1933, Serial No. 702,913

5 Claims. (Cl. 45—82)

This invention relates to desks and tables, and more particularly to a portable desk for use in automobiles.

The general object of the invention is to provide a portable desk which may be readily mounted upon the steering wheel of an automobile or other support for use in writing and reading or other purposes for which such a desk might be used, and which may be as readily removed from its support and stored away when not desired for use.

Another object is to provide a portable desk of the character stated which is simple in construction and may be manufactured and sold at a low cost.

Other objects and advantages will appear hereinafter.

The invention is illustrated in the annexed drawing which forms a part of this specification and in which, Fig. 1 is a vertical longitudinal section of my invention, taken on line 1—1 of Fig. 2, and shown mounted upon the steering wheel of an automobile.

Fig. 2 is a front elevation of my invention as shown in Fig. 1.

Fig. 3 is a vertical section taken on line 3—3 of Fig. 2, showing a detail of construction.

Fig. 4 is an end elevation, partly in section of a modified form of my invention, shown mounted on the steering post over the steering wheel of an automobile.

Fig. 5 is a view like Fig. 4 of another modified form of my invention, shown mounted on a spoke of the steering wheel of an automobile.

Fig. 6 is a vertical longitudinal section, on an enlarged scale, through the clamp for securing my desk, as shown in Fig. 5, on the steering wheel of an automobile.

Fig. 7 is a plan view of another modified form of my invention.

Fig. 8 is a fragmentary vertical section taken on line 8—8 of Fig. 7, showing one of the spring clips securing my desk on the steering wheel of an automobile.

Fig. 9 is a front elevation of another modified form of my invention.

Fig. 10 is an edge view of the desk member of my invention, shown folded up for storing when not in use.

Corresponding parts are designated by the same reference characters in all of the figures of the drawing.

Referring particularly to Figs. 1 to 3 inclusive, my desk comprises a base member 1, a desk member 2 and means 3 for detachably mounting said base member upon the steering wheel of an automobile. The base member 1 comprises a vertically disposed plate 5 and an angle iron rest 6, said plate being formed at its upper portion with an upwardly inclined flange 7, upon which is secured the lower angle member 8 of said rest, the angle member 9 of said rest upstanding from the lower edge of said angle member 8. The mounting means 3 comprises a horizontally disposed rod 10, to which the base plate 5 is secured by screws 11, and a pair of U-shaped spring clips 12, secured to the ends respectively of said rod, for fitting over the rim 13 of the steering wheel of the automobile from the inside of the wheel below the center thereof, whereby the base member 1 is detachably mounted on said wheel. The lower portion of the desk member 2 rests within the rest 6, with its lower side resting upon the lower angle member 8 and its lower edge resting against the upstanding angle member 9 of said rest, while the upper portion of said desk member rests upon the upper portion of the rim 13 of the automobile steering wheel, whereby said desk member is detachably mounted in position over the steering wheel for writing, or for supporting a book or the like in a convenient position for reading, or for any other suitable use for the occupant of the driver's seat in the automobile. The base plate 5 is provided with vertical slots 15 through which the screws 11 extend, by means of which slots the base plate 5, when the screws 11 are unscrewed from the plate, may be moved upwardly or downwardly with relation to the rod 10, and the plate secured in adjusted position upon tightening said screws against said plate, so that the desk member 2 will be elevated sufficiently to escape the horn button 16 in the center of the automobile steering wheel and to give the desk member the desired elevation and inclination. Washers 17 may be placed on the screws 11 between the screw heads and the plate 5 to receive the pressure of the screw heads. The desk member 2 may be formed in two members 18 and 19 hinged together by a hinge 20 so as to be folded together when the desk member is not in use, as shown in Fig. 10, said hinge being disposed in a forwardly extending position when the desk member is placed in operative position upon the rest 6 and automobile steering wheel, as shown in Fig. 2.

In the form of my invention shown in Fig. 4 the rest 6 is secured on the upper end of a rod 21 adjustably secured in a sleeve 22, on the outer end of an arm 23, by a set screw 24, which arm is clamped on the steering post 25 of the automobile steering wheel by means of a clamp 26 on the inner end of said arm.

In the form of my invention shown in Figs. 5 and 6 the rest 6 is secured on the upper end of a rod 30 extending through the clamp bolt 31 of a strap clamp 32, the bight of which encircles a spoke 33 of the automobile steering wheel, which rod may be adjusted in said bolt to adjust the rest 6 to the desired elevation, and the rod and rest secured in adjusted position by a set screw 34 in the head of said clamp bolt.

In the form of my invention shown in Figs. 7 and 8 spring clips 35 are secured to the under side of the desk member 2 which are adapted to spring over and under the rim 13 of the automobile steering wheel for detachably securing said desk member upon and over said steering wheel.

In the form of my invention shown in Fig. 9 a U-shaped frame 40 is secured at its ends 41 to the rest 6 for supporting the upper portion of said desk member. In this form of my invention I may employ the base member 1 and the mounting means 3 shown in Figs. 1 to 3 inclusive, whereby my desk may be detachably mounted upon the automobile steering wheel or upon a stand 42, which stand is constructed with a curved supporting member 43 corresponding to the lower segment of a steering wheel rim which is engaged by the spring clips 12 of the desk mounting means 3.

Having described my invention I claim as new and I desire to secure by Letters Patent:

1. A portable desk comprising a base member, means for mounting said base member upon the steering wheel of an automobile, a rest on said base member, and a desk member resting at its lower edge in said rest and at its upper portion upon the steering wheel.

2. A portable desk comprising a base member, a rod to which said base member is secured, clips on the ends respectively of said rod for engaging the rim of the steering wheel of an automobile for mounting said base on said steering wheel, a rest on said base member, and a desk member resting at its lower edge in said rest and at its upper portion upon said steering wheel.

3. A portable desk comprising a base member, means for mounting said base member upon the steering wheel of an automobile, a desk member, a rest on said base member, means for adjusting said rest for raising or lowering the lower portion of said desk member which rests in said rest, the upper portion of said desk member resting upon said steering wheel.

4. A portable desk comprising a base member, a rod, means for mounting said base member on said rod to be adjusted transversely with relation to said rod, means on said rod for engaging the steering wheel of an automobile for mounting said rod and base on said steering wheel, a rest on said base member, and a desk member resting at its lower edge in said rest and at its upper portion on said steering wheel.

5. A portable desk comprising a base member, means including clips for engaging the lower portion of the rim of a steering wheel for supporting said base upon the lower portion of said wheel, a rest on said base member, and a desk member resting at its lower edge in said rest and at its upper portion upon said steering wheel.

EDWIN M. PINNEY.